May 22, 1951 G. COOPER ET AL 2,554,013
LEAD WIRE POSITIONER

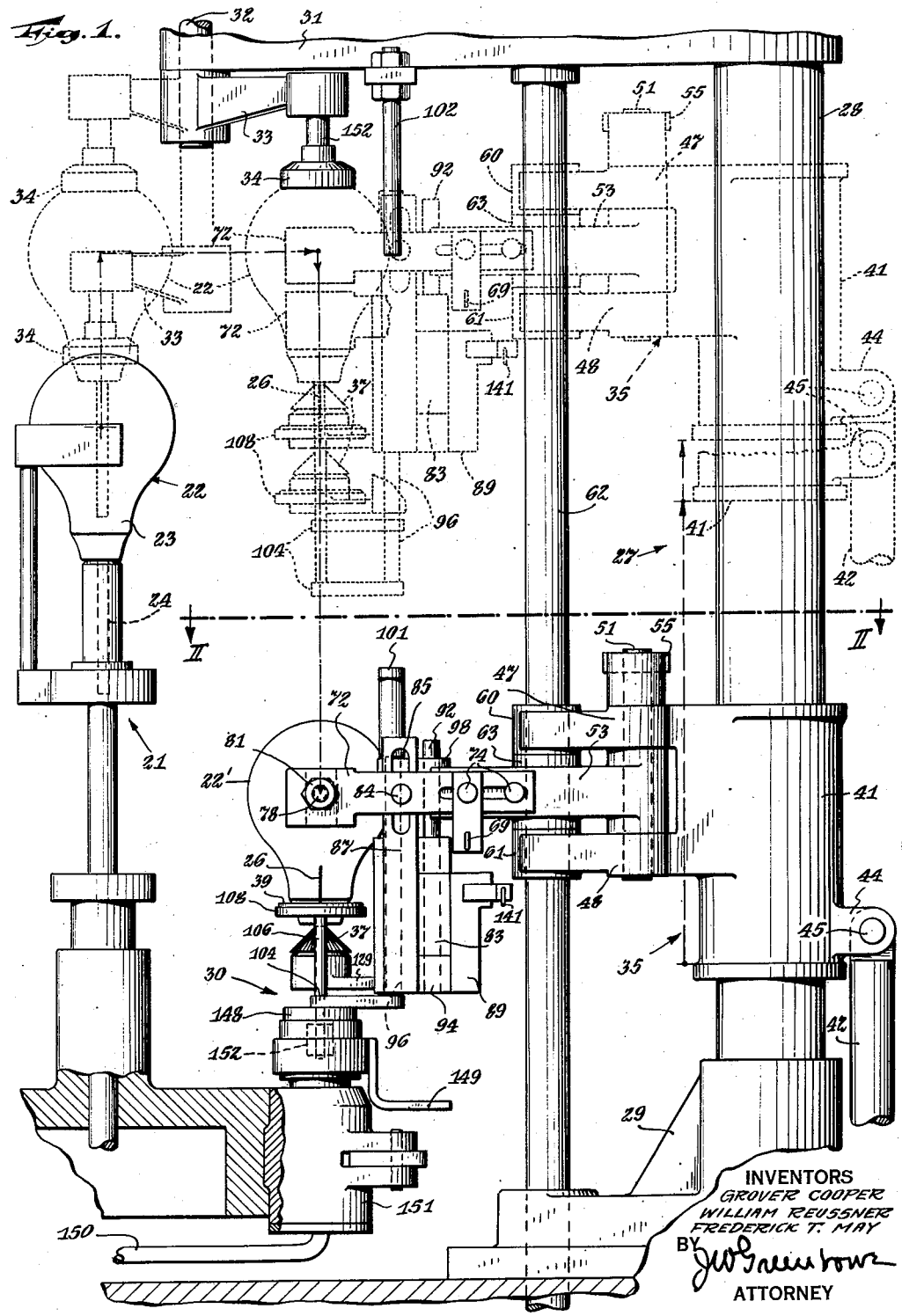

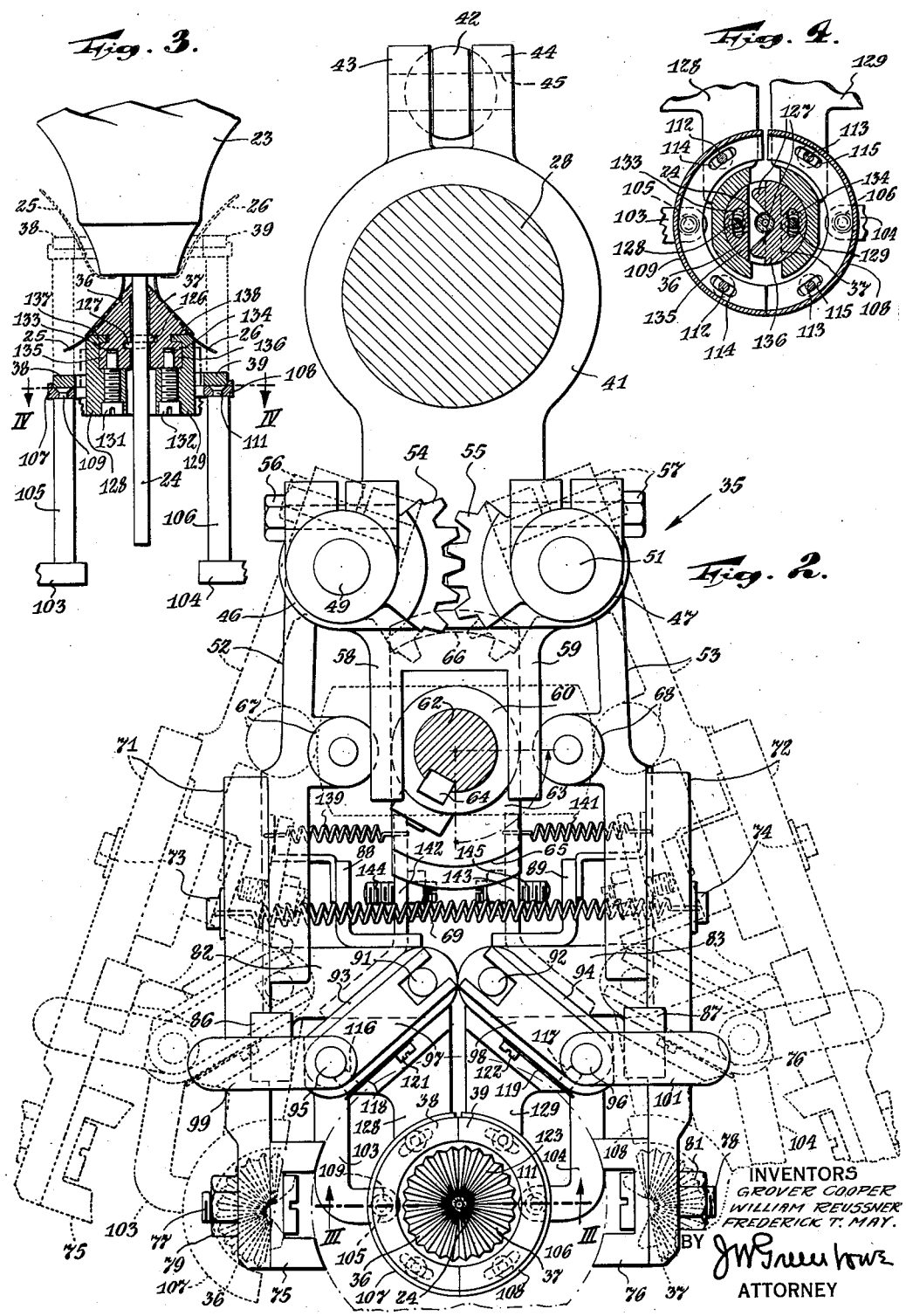

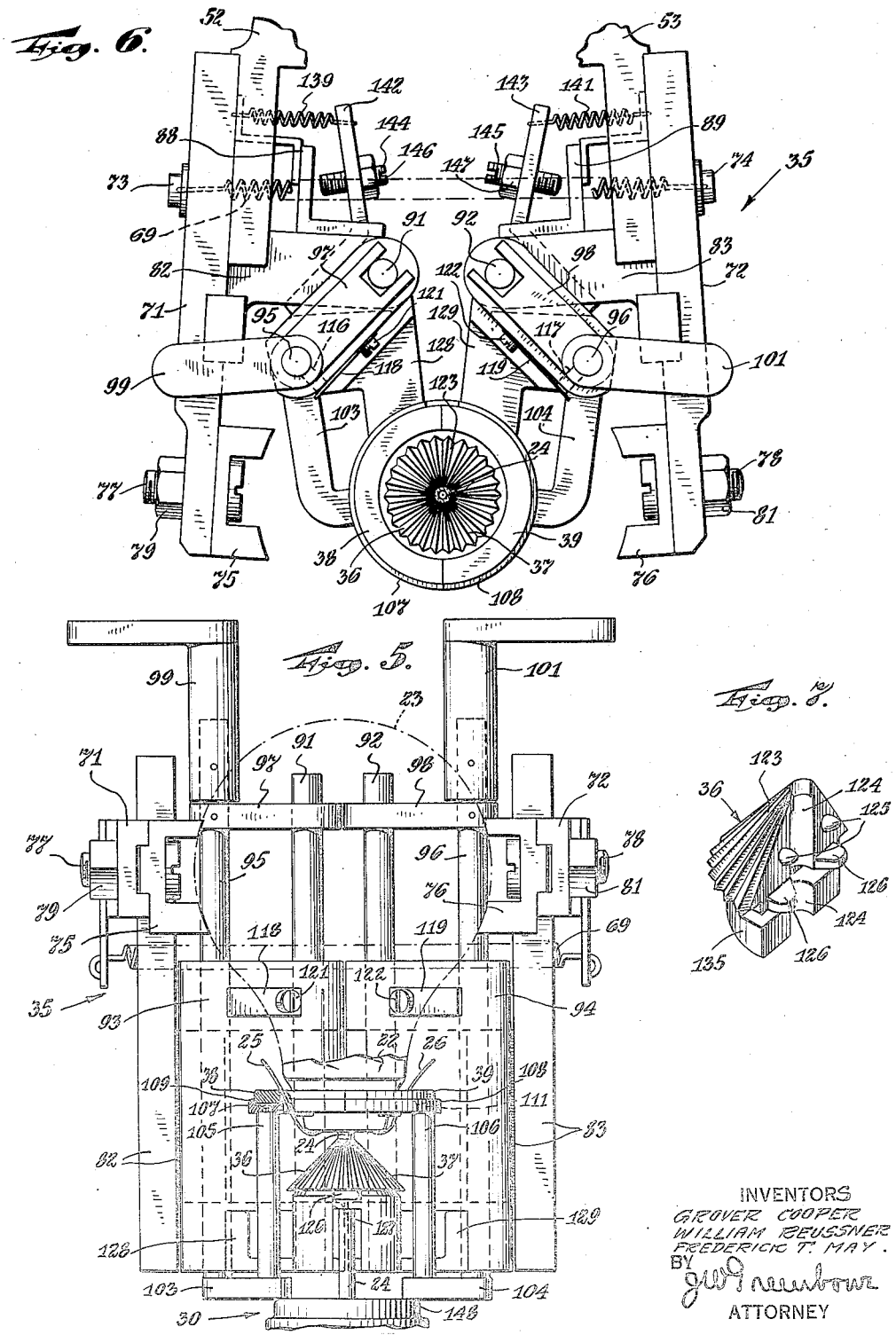

Filed Feb. 26, 1945 4 Sheets-Sheet 4

INVENTORS
GROVER COOPER
WILLIAM REUSSNER
FREDERICK T. MAY
BY
ATTORNEY

Patented May 22, 1951

2,554,013

UNITED STATES PATENT OFFICE 2,554,013

LEAD WIRE POSITIONER

Grover Cooper, West Trenton, William Reussner, Montclair, and Frederick T. May, Verona, N. J., assignors to Westinghouse Electric Corporation, East Pittsburgh, Pa., a corporation of Pennsylvania Application February 26, 1945, Serial No. 579,864

8 Claims. (Cl. 140—71.6)

1

This invention relates to a method and apparatus for positioning the lead wires of envelopes for electrical devices, such as incandescent electric lamps.

The principal object of our invention, generally considered, is to bend the lead wires of electrical devices, such as incandescent electric lamps, during transfer on the sealex machine, so that the devices are delivered to the basing operator with the lead wires in the proper position for basing.

Another object of our invention is a method of positioning the leads of an electrical device, in which such wires depend from the envelope of the device on opposite sides of an exhaust tube, comprising after sealing said devices, automatically separating said leads and then pushing them upward along the outer surface of said envelope.

A further object of our invention is to provide apparatus for automatically positioning the lead wires of electrical devices, such as incandescent electric lamps, which wires extend down along the exhaust tube, comprising means such as a split cone device which after sealing automatically moves upward along the exhaust tube and separates said leads, and means such as a ring which then moves upward around said cone and automatically pushes the leads along the outer surface of the envelope to leave them in the desired position for handling by the base operator.

Other objects and advantages of the invention, relating to the particular arrangement and construction of the various parts, will become apparent as the description proceeds.

Referring to the scale drawings:

Fig. 1 is a fragmentary elevational view of a machine embodying our invention.

Fig. 2 is a fragmentary horizontal plan to a larger scale, with parts in section, on the line II—II of Fig. 1, viewed in the direction of the arrows.

Fig. 3 is a fragmentary vertical sectional view on the line III—III of Fig. 2, in the direction of the arrows.

Fig. 4 is a fragmentary plan, with parts in section on the line IV—IV of Fig. 3, viewed in the direction of the arrows.

Fig. 5 is a fragmentary elevational view of the apparatus illustrated as viewed from the left in Fig. 1 and to the scale of Fig. 2.

Fig. 6 is a fragmentary plan corresponding to Fig. 2, but showing the parts in a position intermediate the full and dotted lines of that figure.

Fig. 7 is a perspective view of one of the conical wire-separating elements.

Figure 12:
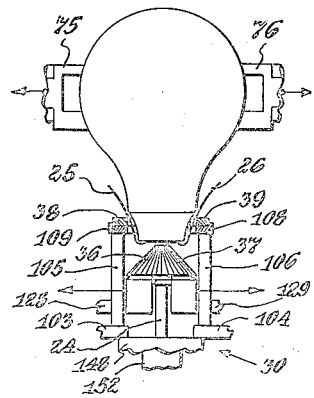

Fig. 12 is an elevational view illustrating the final position in which the lamp transfer arms have moved the lamp down to insert the exhaust tube in the rubber connection to the vacuum pump, thereby causing the separator lead wires to be pushed upwardly along the lamp envelope by the ring device which encircles said wire separating cone, prior to a separation of the cone and ring elements and a release of the lamp by the lamp transfer arms, preparatory to the reception of the subsequent lamp, after allowing the released lamp to index to the next position on the exhaust portion of the machine.

As is well known to those skilled in the art, in automatically manufactured incandescent electric lamps on a large scale, said lamps, after the interior parts are subjected to what is termed "mounting" and assembled in the envelope or bulb, pass on to a sealing, or the sealing portion of a "sealex," machine in which the envelopes are sealed to the flare tubes of the mounts which serve to support the incandescible filaments, the exhaust tubes and lead wires from said filaments depending from the envelope after sealing. Each lamp is then transferred to the exhaust portion of the machine where, after successively indexing through several positions disposed about a center around which the machine rotates, it is tipped off and passes on to be based. These machine portions are associated to operate as a unit. Throughout the development of this type of group it has always been a problem to balance the efforts of the operatives.

The mounting machine, generally speaking, has excess capacity. Over a period of years many improvements have been made to the sealex machine to relieve the effort of the operative thereon. At the present time, prior to the introduction of our invention, the basing machine is the "bottle neck" of the group, the group as a whole being limited to the number of lamps that the basing operator can process.

In order to lessen the work of the basing operator and to allow her time to base more lamps, we have produced a method and machine for placing the lead wires in the optimum position for use upon reaching the basing machine. Fundamentally our machine comprises a split cone-shaped element, with the vertex of the cone pointing upward. On the conical surface are formed grooves, starting at the vertex and ending at the periphery of the cone. These grooves give the face a saw-tooth or corrugated appearance, the grooves running as elements of the conical surface. The cone is provided with a central aperture to accommodate an exhaust tube of a lamp being processed. Surrounding the cone sections is a split sleeve which is mounted for movement with respect to said sections.

These elements are mounted to operate on each lamp as it is transferred from the upper level or sealing portion to the lower level or exhaust portion of the sealex machine, whereby the leads of the lamps are removed from the vicinity of the exhaust tube and pushed up along the outer surface of the lamp, thereby avoiding interference with the fires during the tipping off operation, as well as having them in the desired position for handling by the basing operator.

Referring to the drawing in detail, like parts being designated by like reference characters, and first considering the elements of the device shown in detail in Figs. 1 to 7, inclusive, there is shown in Fig. 1 a portion of the sealex machine 21, in the last position on which is indexed a lamp 22, the envelope 23 of which has been sealed about an associated mount, leaving the exhaust tube 24 and associated leads 25 and 26 of said mount depending therefrom.

Fig. 1 also shows a portion of the associated transfer and lead-wire positioning apparatus 27, which includes a standard 28 upstanding from a base 29, and having an upper bracket portion 31 in which is movable a rotary and reciprocatory shaft 32 carrying on its lower end portion a transfer arm 33 having a suction rubber 34 adapted to either grip or release the upper portion of a lamp bulb or envelope 23, so that it can transfer such lamps one at a time from the sealing portion of the machine 21 to the exhaust portion 30.

The apparatus 27 is provided with a lamp-gripping device, generally designated by reference character 35. The elements of this device, which also include the lead wire separating or wedging means, such as cone elements 36 and 37, and the associated wire positioning ring elements 38 and 39, for engaging portions of the separated leads remote from the exhaust tube 24, the inner diameter of which is only slightly larger than the outer diameter of the cone elements, are carried by a slide 41 which reciprocates on the standard 28, being moved therealong by suitable cam-operated mechanism which actuates a connecting rod 42. The upper end of the connecting rod 42 is united between lug portions 43 and 44 to the slide 41 by pivot pin 45. The slide 41 has upper bearing portions 46 and 47 and corresponding lower bearing portions 48, in which are journalled shafts 49 and 51, fixed with respect to the hubs of transfer arms 52 and 53.

In order to cause said transfer arms 52 and 53 to angle simultaneously about their journals, the upper ends of said shafts 49 and 51 carry gear segments 54 and 55, clamped thereto as by means of bolts 56 and 57, and meshing with one another, as illustrated most clearly in Fig. 2. The slide 41, beyond the bearing portions 46, 47, and 48, is bifurcated as indicated at 58 and 59 to receive bearing blocks 60 and 61 for the shaft 62. The upper end of shaft 62 is journalled in the bracket 31, and the lower end is journalled in the base 29, and passes on for connection with mechanism, synchronized with the mechanism which operates the connecting rod 42, for turning said shaft as desired to move the arm cam 63, connected thereto by key 64 and slidable therewith on said shaft.

The cam 63 carries curved surfaces 65 and 66, desirably protected by hardened inserts, which upon sufficient turning of the shaft 62, engage rollers 67 and 68 on the arms 52 and 53, respectively, to open or move apart the lamp transfer arms 52 and 53 against the action of the associated coil spring 69. In order to allow for different size lamps, the transfer arms desirably include extensions 71 and 72, adjustably connected by bolts 73 and 74, passing through apertures in the arms 52 and 53 and corresponding adjustment slots in the extensions. At the end portions of the extensions are mounted lamp-gripping insert elements 75 and 76, desirably formed of insulating material such as Transite, and connected to the end portions of the respective extensions in any desired manner, as by means of bolts 77 and 78 and associated nuts 79 and 81.

The main support blocks 82 and 83, for the cone and ring sections, are secured to their respective transfer arm extensions 71 and 72, as by means of bolts 84 passing through slots 85 in upright portions 86 and 87 thereof, in order to adjust them at the desired elevation. These blocks 82 and 83 carry stop and spring supports 88 and 89, respectively, and are apertured to receive the wire-bender shafts 91 and 92 which movably carry the wire tension pivot blocks 93 and 94. The outer ends of these pivot members carry pivot rods 95 and 96, at the upper ends of which are mounted ring pin guides 97 and 98, and stop guards 99 and 101, the upper ends of which are adapted to engage stop rods 102 fixed to the bracket 31 in adjusted position. The other ends of the ring pin guides are bifurcated to receive the upper ends of the wire bender shafts, 91 and 92, respectively.

The lower ends of the rods 95 and 96 carry ring brackets 103 and 104, respectively, the free ends of which carry ring pins 105 and 106, respectively. These pins carry ring supports 107 and 108, respectively, as by having reduced sections 109 and 111 thereon, received in corresponding but countersunk apertures in the supports, which extensions are desirably upset therein and the connections made more secure by brazing. The ring support sections carry the ring sections 38 and 39, respectively. The connection between the ring elements and the ring supports is desirably effected by having bolts 112 and 113 projecting downwardly from the ring sections 38 and 39, respectively, and received in circumferential elongated slots 114 and 115 in said ring supports, thereby allowing for circumferential adjustment of the ring sections with respect to the supports so that when the parts are moved together the ring sections always have their corresponding ends brought into engagement with one another.

even though the supports may be slightly separated.

Friction pins 116 and 117 are desirably, respectively, fitted in wire tension pivot members 93 and 94 and urged into engagement with pivot rods 95 and 96, respectively, by means of flat springs 118 and 119 secured to the respective pivot members by screws 121 and 122, so that said pivot rods will stay in set vertical position with respect to said pivot members.

The associated cone elements 36 and 37 are formed generally as shown in detail in Figs. 3 to 7, inclusive, that is, the outer or conical surface is grooved, as indicated at 123, said grooves being generally angular, as illustrated, so that the surface has a corrugated or saw-tooth appearance. The grooves increase gradually in depth toward the periphery of the conical surface and are adapted to guide the lead wires as they engage it and separate them radially, while preventing them from turning sideways during such separation.

In order that the conical elements may accurately nest together, as well as guide the exhaust tube into the central aperture 124, one of said elements, 36 for example, has prongs 125 receivable in corresponding sockets in the other, while having curved flanges 126 and 127, respectively, which interleave with respect to one another, that is, the flanges 126 overlie the flanges 127, the flanges on one being received in corresponding slots in the other, so that there is no plane of cleavage between the conical sections after they have closely approached one another. The conical sections are adjustably mounted on wire bender supports 128 and 129, which respectively project from the lower portions of the wire tension pivot blocks 93 and 94, being secured thereto in any desired manner. This flexible or articulated connection is, in the present embodiment, effected by screws 131 and 132 which project through and from the split sleeve portions of the supports 128 and 129 and are received in corresponding circumferentially elongated slots 133 and 134 in the base portions 135 and 136 of the conical elements 36 and 37. Portions of the conical element bases underlie interlocking flanges 137 and 138 on the supports 128 and 129. It will therefore be seen that the conical elements 36 and 37 are held on the supports 128 and 129, while being allowed to adjust themselves with respect to one another for accurate registry when moved together, thereby preventing the allowance of any space therebetween in which one of the lead wires might catch, after they have been moved to engagement with one another.

In order to insure that the cone and ring elements close about the exhaust tube, prior to complete closure of the lamp transfer arms about the lamp, said elements are urged together by tension springs 139 and 141 acting between wire tension brackets 142 and 143, respectively connected to the wire tension pivot blocks 93 and 94, and stop and spring supports 88 and 89. To prevent excessive relative movement between the ring and cone supports and the lamp transfer arms, bolts 144 and 145, adjusted by cooperating nuts 146 and 147, are provided in the brackets 142 and 143 for engagement with the stop and spring supports 88 and 89 at the limit of travel.

The operation of our apparatus is desirably as follows, reference being had particularly to Figs. 1, 2, 6, and 8 to 12, inclusive.

Figure 8:
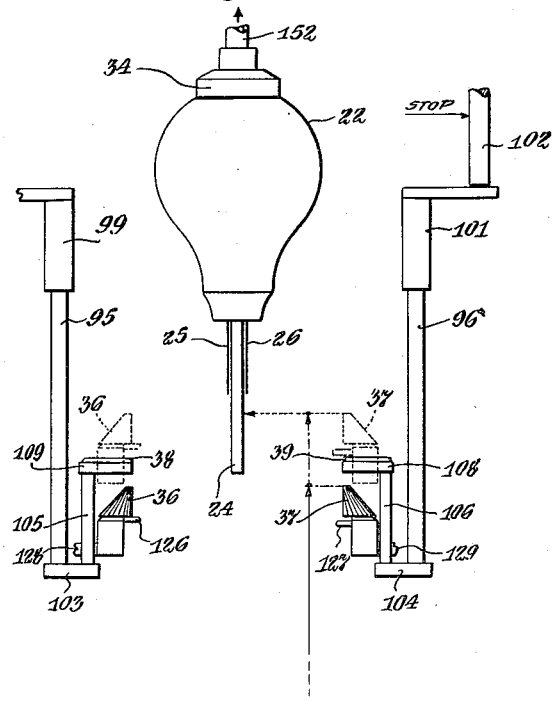
Fig. 8 is a diagrammatic representation to illustrate the first position of the parts at the beginning of the wire-separating operation, after a lamp has been transferred from the sealing to the exhaust portion of a sealex machine, but prior to connecting its exhaust tube to the vacuum pump.

A lamp 22 arrives at the last position on the sealing portion of the machine 21, and is there engaged by the suction cap 34 and raised from the full to the dotted-line position at the left, and then swung over to the dotted-line position at the right in Fig. 1, corresponding with that illustrated in Fig. 8. At this time, the lamp transfer arms 52 and 53 are in lowered position, shown in full lines in Fig. 1, where they are at a height corresponding with the position of the lamp bulb when the exhaust tube thereof is received in the conventional compression rubber, 152, the exhaust head cap of which is designated 148, controlled by conventional arm 149, so that said lamp may be connected to the vacuum line 150, controlled by conventional valve 151. The arms are separated, as viewed in dotted lines in Fig. 2, and have released the preceding lamp 22', to move on to the next position on the exhaust portion 30 of the machine.

With the lamp in the position represented by dotted lines at the right in Fig. 1 and in Fig. 8, and held by the vacuum applied to the suction cap 34 through the pipe 152, the lamp transfer arms 52 and 53, associated cone sections 36, 37, and associated ring sections 38 and 39, separated and in the relative vertical positions shown in full lines in Fig. 8, and the cam 63, are raised, as the slide 41 is moved upward by operation, from a suitable source of power, of its connecting rod 42, toward the lower dotted position represented in Fig. 1.

Figure 9:
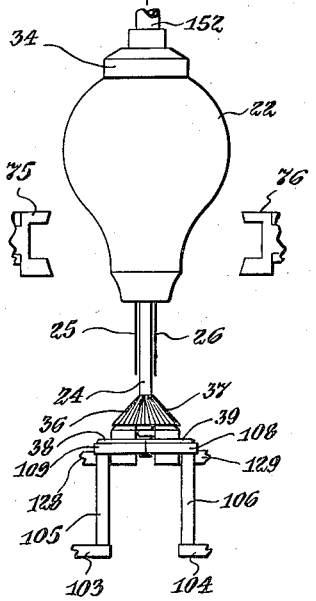
Fig. 9 illustrates a succeeding position in which the wire positioning cone has closed about the exhaust tube, and the lamp transfer arms have moved part of the way toward the lamp.

This upward movement of the mechanism causes the cone sections 36 and 37 to move from full to dotted positions, as viewed in Fig. 8, overrun the ring sections 38 and 39, which are held back by the stop guards 99 and 101 thereof engaging the fixed stops 102, and the shaft 62 turns, moving the arm cam 63, from its position where it holds the lamp transfer arms and the associated ring and cone sections apart, as shown in Fig. 2 in dotted lines and in Fig. 8, to a position where said transfer arms approach each other and said ring and cone sections engage each other about the lamp exhaust tube 24, as viewed in Figs. 6 and 9, at the same time drawing in the stop guards 99 and 101 to clear the stops 102 and thereafter allow the ring and cone sections to move up together.

Figure 10:
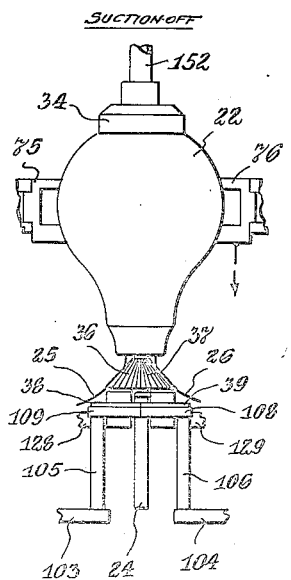
Fig. 10 illustrates a subsequent position in which the wire separating cone has moved upward along the exhaust tube to separate the lead wires from one another, and the lamp transfer arms have closed to final position about the lamp.

The parts are then in the position where the Transite inserts on the transfer arms are still sufficiently separated to clear the lamp, as the mechanism is elevated still further by the connecting rod 42, that is, from the lower dotted position represented in Fig. 1 and in Fig. 9, to that represented in the upper dotted position in Fig. 1 and in Fig. 10, except that the Transite inserts are spaced as in Fig. 6 and have still not yet been brought together sufficiently to actually grip the bulb of the lamp. During this movement, the cone sections wedge in between the leads 25 and 26 and the exhaust tube 24 and separate said leads, as shown most clearly in Fig. 10.

The relative positions of the cone and ring thus change from those shown in full lines in Fig. 8 to those of Figs. 9 and 10. As soon as the mechanism reaches the position illustrated in Fig. 10, further turning of the arm cam 63 allows the transfer arms 52 and 53 to be drawn together by the spring 69 to the extreme innermost position, where the lamp therebetween is gripped, as viewed in full lines in Fig. 2 and in Fig. 10.

Figure 11:
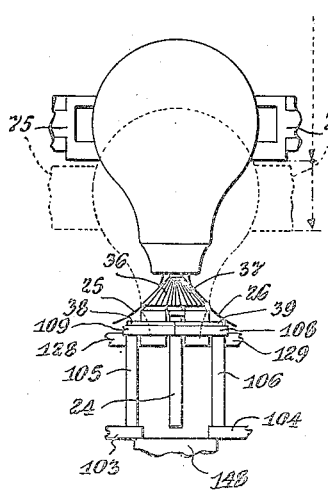
Fig. 11 illustrates in full lines a subsequent position in which the lamp transfer suction cup has been removed to get the next lamp, the dotted lines representing the next move to be made by the lamp transfer arms and associated lamp.

The vacuum is then released from the pipe 152, and the transfer arms 52 and 53 are moved down, by the connecting rod 42, from the upper dotted line position as viewed in Fig. 1 and in Fig. 10, to the full-line position shown in Fig. 11 where the ring brackets 103 and 104 engage the top of the compression rubber cap 148, and the suction cap 34 swings back toward the last position on the sealing portion of the machine 21, to take the next lamp therefrom.

Further movement of said transfer arms, causes said cap 148 to hold up said ring brackets 103 and 104, and slide the rods 95 and 96 with respect to the downwardly moving wire tension pivot blocks 93 and 94, against the frictional resistance offered by the spring-pressed pins 116 and 117 engaging the same. This causes the exhaust tube 24 to be inserted in the exhaust rubber, and the cone elements 36 and 37 to be depressed below the level of said ring elements 38 and 39, along with the neck of the lamp bulb, whereby the leads 25 and 26 are held up by the ring elements and pushed along the bulb neck upwardly toward the generally spherical portion thereof, to the position illustrated in Fig. 12.

When this has been accomplished, further turning of the arm cam 63 separates the transfer arms and then the cone and ring sections, as represented by the arrows in Fig. 12, by engaging the rollers 67 and 68 on said arms, thereby releasing the lamp, which now has its exhaust tube firmly set in the compression rubber, so that said lamp is thereby put on exhaust and moves on with the exhaust portion 30 of the machine 21 to be indexed at the next position, while the mechanism is ready for the reception of the next lamp.

Briefly, the operation involves the following steps:

(1) A lamp 22 arrives at the last position of the sealing portion of the sealex machine 21.

(2) The lamp is engaged by the suction cap 34, raised from the full to the dotted line position at the left, and then swung over to the dotted line position at the right, in Fig. 1.

(3) The lamp transfer arms 52 and 53, associated cone sections 36 and 37, and associated ring sections 38 and 39, separated as shown in dotted lines in Fig. 2, are raised toward the lower dotted position represented in Fig. 1.

(4) Such upward movement causes the cone sections to move from full to dotted positions as viewed in Fig. 8 overrun the ring sections 38 and 39 which are held back by the stop guards thereof engaging the fixed stops 102 and the cam 63 on the shaft 62 turns to a position where the transfer arms are allowed to approach each other, under the action of the spring 69, and the ring and cone sections engage each other about the lamp exhaust tube, as viewed in Figs. 6 and 9, at the same time releasing the stop guards from the fixed stops 102, so that the ring and cone sections can thereafter move up together.

(5) The transfer arms and associated mechanism move from the lower dotted position represented in Fig. 1 and in Fig. 9 to that represented by the upper dotted position in Fig. 1 and in Fig. 10 with the Transite inserts spaced to clear the lamp bulb, while the cone sections wedge in between the leads and exhaust tube, separating said leads as shown in Fig. 10.

(6) Further turning of the arm cam 63 allows the transfer arms 52 and 53 to be drawn together by the spring 69 to the extreme innermost position where the lamp is gripped, as viewed in full lines in Fig. 2 and in Fig. 10.

(7) The vacuum is released from the suction cap 34, the transfer arms moved down from the upper dotted position as viewed in Fig. 1 and in Fig. 10 to the full line position shown in Fig. 11, where the ring brackets 103 and 104 engage the top of the compression rubber cap 148, and said cap 34 swings back toward the last position on the sealing portion of the sealex machine 21 to take the next lamp therefrom.

(8) Transfer arms are moved further downward while the cap 148 holds up the ring brackets 103 and 104, sliding the rods 95 and 96 with respect to the downwardly moving wire tension pivot blocks 93 and 94.

(9) The exhaust tube is inserted in an exhaust rubber of the exhaust portion 30 of the machine.

(10) The cone elements 36 and 37 and the neck of the bulb are depressed below the level of the ring elements 38 and 39.

(11) The leads 25 and 26 are held up by the ring elements telescoping over the cone elements and pushed along the bulb neck, upwardly toward the generally spherical portion thereof.

(12) The arm cam 63 turns further, first separating the transfer arms, and then the cone and ring sections, thereby releasing the lamp, which is on exhaust and allowed to move on to the next position, while the mechanism is ready for the reception of the succeeding lamp.

From the foregoing disclosure, it will be seen that we have provided mechanism which automatically takes a lamp from the last position on the sealing portion of the sealex machine, swings it to the first position on the exhaust portion of said machine, and moves it down to fit its exhaust tube into the exhaust rubber at said first position, while separating the leads and pushing them up along the lamp envelope, thereby getting them out of the way for tipping-off operation, as well as leaving them in the most desirable position for handling by the basing operator.

Although a preferred embodiment of our invention has been disclosed, it will be seen that other modifications may be made within the spirit and scope of the appended claims.

We claim:

1. Apparatus for automatically positioning the lead wires of an electrical device including an envelope to be evacuated, an exhaust tube depending therefrom, and leads extending down along said tube, comprising a device with a conical surface grooved to prevent engaged lead wires from turning sideways during separation, means causing said device to encircle said tube, move upwardly therealong and separate said leads, a ring device of diameter greater than that of said conical device, and means causing the latter thereafter to start from below said conical device and move upward relative thereto, engaging said separated leads beyond the zone of engagement by said grooved conical surface, and pushing them along the outer surface of said envelope.

2. In an exhaust machine, apparatus for automatically positioning the lead wires of an electrical device including an envelope to be evacuated, an exhaust tube depending therefrom, and leads extending down along said tube, comprising a two-part device with a conical surface grooved to prevent engaged lead wires from turning sideways during separation, each part of which is formed with a complementary groove adapted to closely receive such an exhaust tube, means causing said device to close about said tube, receiving it in said grooves, move upwardly therealong and separate said leads, and a ring which starts from below said conical device and moves axially upward relative thereto to telescope over the conical device parts when together and push said leads along the outer surface of said envelope as said electrical device is being placed on exhaust.

3. In a machine provided with an exhaust rubber for receiving the exhaust tube of lead-carrying devices to be evacuated, a standard, a slide movable therealong, a power-operated connecting rod for moving said slide up and down on said standard, a pair of device-holding arms pivoted to said slide, resilient means urging said arms together, a rotatable shaft and an arm operating cam between said arms and movable by and slidable on said shaft, whereby said arms are moved toward and from one another as the shaft rotates; the improvement which includes separable cone elements and separable ring elements, said cone and ring elements being carried by, and movable with respect to, said arms, said cone elements being vertically movable with respect to said ring elements and serving during operation of the machine to separate the leads of one of said devices prior to engagement by said arms, and said ring elements thereafter telescoping over the cone elements and serving to push the separated leads upwardly along said device.

4. In a machine provided with an exhaust rubber for receiving the exhaust tube of lead-carrying lamp envelopes to be evacuated, a standard, a slide movable therealong, a power-operated connecting rod for moving said slide up and down on said standard, a pair of lamp-holding arms pivoted to said slide, resilient means urging said arms together, and power means for moving said arms from one another; the improvement which includes separable cone elements and separable ring elements, said cone and ring elements being carried by, and movable with respect to, said arms, said cone elements being vertically movable with respect to said ring elements and serving during operation of the machine to separate the leads of one of said lamp envelopes prior to engagement by said arms, and said ring elements thereafter serving to telescope over the cone elements and push the separated leads upwardly along said envelope.

5. In a machine of the class described, an exhaust rubber for receiving a depending exhaust tube of a lamp bulb to be evacuated, wherein leads depend therefrom along said tube, and means for separating said leads and bending them so they project upward along their bulb, comprising an upright standard, an element slidable therealong, a pair of normally upright shafts journalled in said slidable element, arms carrying rollers, and having hubs respectively fixed on said shafts, spring means urging said arms together to grip a lamp bulb, meshing gear segments respectively fixed on said shafts to cause said gripping arms to simultaneously move toward or away from one another, a turnable shaft extending parallel to said standard, a cam carried by said shaft and having curved surfaces engaging said rollers to move said arms away from or allow them to be drawn toward one another, main support means depending from said arms, a shaft passing through each of said support means, a pivot block on each shaft, a pivot rod frictionally carried in each block, a ring pin guide and stop guard mounted at the upper end of each rod, stop rods mounted on said machine and engageable by said guards, a ring bracket carried by the lower end of each pivot rod, a pin carried by each of said brackets, a ring support carried by each of said pins, a ring section adjustably carried by each of said supports, a section with a grooved conical surface carried by each of said pivot blocks, to together form conical means for initiating the bending of said leads, one of said cone sections having prongs receivable in corresponding sockets of the other, said cone sections also having curved flanges which interleave with respect to one another, so that there is no plane of cleavage therebetween when brought together, springs from said arms urging said ring and cone sections together, in order to insure closure thereof about a lamp bulb exhaust tube prior to complete closure of the arms about said lamp bulb, and means for first moving said support means upward with respect to a positioned lamp bulb, after the cone and ring elements have been brought together about the exhaust tube thereof, so that said cone elements slightly separate said leads, and then moving said support means downward after the arms have gripped said bulb, to move the exhaust tube into the rubber and the cone elements down more than the ring elements, which are stopped at said rubber, whereby the ring elements hold up said leads and cause them to lie along said bulb.

6. In a machine of the class described, means for separating the leads extending along an exhaust tube depending from a lamp bulb and bending them so that they project upwardly along said bulb, comprising an upright standard, arms pivoted with respect to and movable along said standard, spring means urging said arms together to grip a lamp bulb, a turnable shaft extending parallel to said standard, a cam carried by said shaft and having curved surfaces to actuate said arms away from or allow them to be drawn toward one another, main support means depending from said arms, a shaft passing through each of said support means, a pivot block on each shaft, a pivot rod frictionally carried in each block, a ring bracket carried by the lower end of each pivot rod, a ring section adjustably carried by means of each bracket, a section with a grooved conical surface carried by each of said pivot blocks, springs from said arms urging said ring and cone sections together in order to insure closure thereof about a lamp bulb exhaust tube prior to complete closure of the arms about said lamp bulb, and means for first moving said support means upward with respect to a positioned lamp bulb, after the cone and ring elements have been brought together about the exhaust tube thereof, so that the cone elements slightly separate said leads, then moving said support means downward, after the arms have gripped said bulb, and then moving cone elements down more than the ring elements, whereby the ring elements hold up the leads and cause them to lie along said bulb.

7. In an exhaust machine comprising a capped exhaust rubber for receiving the exhaust tube of each lamp to be evacuated, a standard, a slide movable therealong, a power-operated connecting rod for moving said slide up and down on said standard, a pair of lamp transfer arms pivoted to said slide, resilient means urging said arms together, means for temporarily positioning each lamp above said arms, a rotatable shaft, the movement of which is synchronized with that of said rod, and an arm-operating cam between said arms and movable by and slidable on said shaft, whereby said arms are moved toward and from one another as the shaft rotates; separable cone elements swingably carried by said arms, separable ring elements coaxial therewith, of interior diameter greater than the exterior diameter of said cone elements, frictionally and swingably carried by said arms on means slidable vertically with respect to said arms and cone elements and extending below the latter, whereby when said connecting rod moves the slide upward while the arms and cone and ring elements are separated, said shaft cam turns to bring said cone and ring elements about the exhaust tube of a positioned lamp, the cone elements slide upward on said tube and separate the leads, the transfer arms grip the lamp as the shaft cam further turns, and on the return movement of the rod the lamp is released by the temporary positioning means, the slide moves down carrying the gripped lamp, cone and ring elements toward the exhaust rubber cap, until the slidable carrying means of the ring elements are stopped thereat, while the lamp and cone elements continue to descend, causing the separated leads of said lamp to be pushed upwardly therealong by said ring elements telescoping over the cone elements.

8. In an exhaust machine comprising a capped exhaust rubber for receiving the exhaust tube of each lamp to be evacuated, a standard, a slide movable therealong, a connecting rod for moving said slide up and down on said standard, a pair of lamp transfer arms pivoted to said slide, resilient means urging said arms together, a suction cap with a vacuum connection, means operating said cap to engage, move, and temporarily hold each lamp in a position above said arms and in line with but above said exhaust rubber, a turnable operating shaft disposed parallel to said standard, the movement of which is synchronized with that of said rod, and an arm-operating cam movable by and slidable on said shaft between said arms, whereby said arms are moved toward and from one another as the shaft turns; separable cone elements swingably carried by said arms, separable ring elements coaxial therewith, of interior diameter greater than the exterior diameter of said cone elements, frictionally and swingably carried by said arms on means slidable vertically with respect to said arms and cone elements and extending below the latter, resilient means for holding said cone and ring elements in engagement, as the transfer arms separate to a limited extent, and stop elements for thereafter causing said cone and ring elements to separate with said arms, whereby when said connecting rod moves the slide upward while the arms and cone and ring elements are separated, said shaft cam turns to bring said cone and ring elements about the exhaust tube of a suction-cap-held lamp, the cone elements slide upward on said tube and separate the leads, the transfer arms grip the lamp as the shaft cam further turns, and upon release of the vacuum connection to the suction cap, the slide moves down carrying the lamp, cone and ring elements toward the exhaust rubber cap, until the slidable carrying means of the ring elements are stopped thereat, while the lamp and cone elements continue to descend, causing the separated leads of said lamp to be pushed upwardly therealong by said ring elements telescoping over the cone elements.

GROVER COOPER.
WILLIAM REUSSNER.
FREDERICK T. MAY.

REFERENCES CITED

The following references are of record in the file of this patent:

UNITED STATES PATENTS

| Number | Name | Date |
|---|---|---|
| 1,626,679 | Kelly | May 3, 1927 |
| 1,655,279 | McGowan | Jan. 3, 1928 |
| 1,733,881 | Illingworth | Oct. 29, 1929 |
| 2,069,086 | Donovan et al. | Jan. 26, 1937 |
| 2,132,538 | McGowan | Oct. 11, 1938 |